UNITED STATES PATENT OFFICE 1,990,127

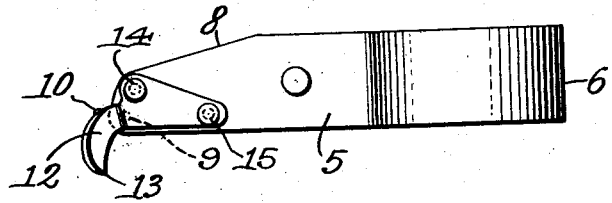
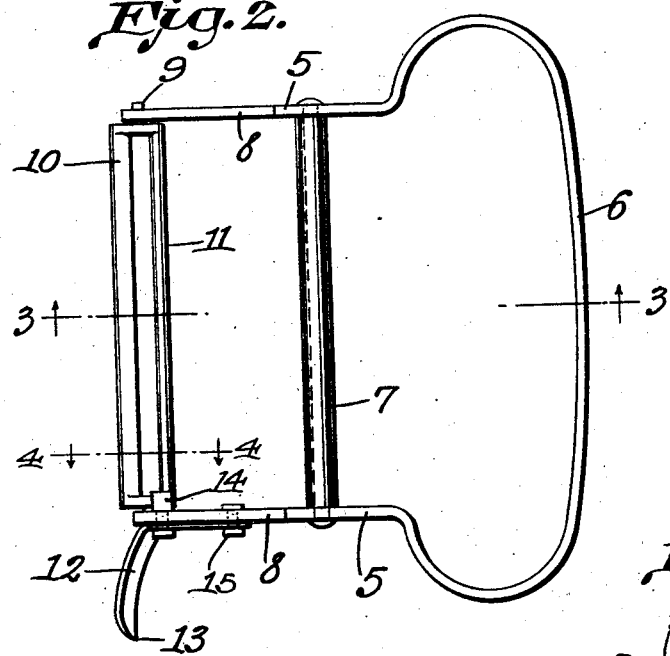
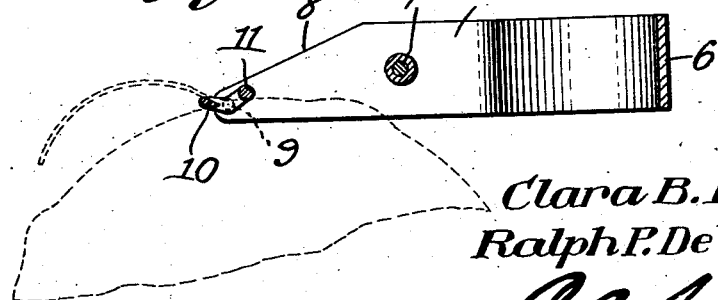

POTATO PEELER

Clara Birchard Lambert and Ralph Pulliam De Vault, Pasadena, Calif.

Application November 23, 1933, Serial No. 699,433

2 Claims. (Cl. 30—20)

This invention relates to a device designed primarily for paring vegetables or fruit, such as potatoes, apples, pears, or the like.

An important object of the invention is to provide a device of this character including a pivoted blade so constructed that the blade, during the peeling or paring operation, will follow the contour of the article under treatment, to the end that the blade will move readily over irregularities on the surface of the article, thereby insuring against the blade cutting too deep, with the resultant waste.

A further object of the invention is to provide means on the body portion for cutting away the eyes of potatoes, or spoiled portions of the fruit or vegetables being prepared.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a potato peeler constructed in accordance with the invention.

Figure 2 is a plan view thereof.

Figure 3 is a sectional view taken on line 3—3 of Fig. 2.

Figure 4 is a sectional view taken on line 4—4 of Figure 2.

Referring to the drawing in detail, the paring device forming the subject matter of this invention, includes a body portion embodying parallel leg members 5 that are connected by the handle portion 6, the leg members being held in spaced relation with each other by means of the brace rod 7, that is shown as having its ends connected to the leg members 5.

As clearly shown by the drawing, the forward upper edges of the leg members 5, are cut away as at 8 and are formed with openings near their free ends, to receive the pins 9 that extend from the blade 10.

These pins 9 provide supports for the blade 10, which permit of pivotal movement of the blade 10 with respect to the leg members, so that the blade may pivot freely, while in use.

The blade 10 is arranged at an oblique angle with respect to the rod 11, that is of a length equal to the length of the blade and disposed slightly above the blade, so that the rod will contact with the surface of the potato or article under treatment, to the end that the blade will be moved vertically and caused to ride over enlargements or irregularities on the surface of the article being pared with the device.

From the foregoing it will be seen that due to the construction shown and described, the blade will be guided in its operation, so that the blade will operate at a predetermined depth, and the paring will be of a uniform thickness, eliminating waste.

Extending laterally from one of the leg members, is a blade indicated by the reference character 12, which blade has a pointed extremity 13 adapted to stick into the article under treatment, so that the eyes of potatoes, or spoiled portions of the vegetables or fruit being pared, may be readily removed.

This blade 12 is secured to the body portion by means of the rivets 14 and 15, the head of the rivet 14 extending inwardly an appreciable distance where it is engaged by the rod 11, restricting movement of the blade 10.

Having thus described the invention what is claimed is:

1. A paring device comprising a frame, parallel leg members forming a part of the frame, a cutter pivotally mounted between the parallel leg members and comprising curved end members, a blade, the ends of the blade being secured between the end members, adjacent to the outer ends thereof, a guide rod circular in cross-section, connected to the end members adjacent to the opposite ends thereof, and a stop extending inwardly from one of the leg members and adapted to be engaged by one of the end members, restricting pivotal movement of the cutter.

2. A paring device comprising a body portion embodying a length of metal bent intermediate its ends providing a wide handle and parallel leg members, a cutter pivotally mounted between the parallel leg members, said cutter embodying curved end members, a blade secured to the end members, a rod connecting the end members and disposed in spaced relation with the blade and providing a guide for the blade, a stop extending from one of the leg members and adapted to be engaged by the cutter, restricting pivotal movement of the cutter with respect to the frame.

CLARA BIRCHARD LAMBERT.
RALPH PULLIAM DE VAULT.